E. J. COOK.
VALVE FOR MOTORS.
APPLICATION FILED APR. 24, 1911.
1,107,903.
Patented Aug. 18, 1914.
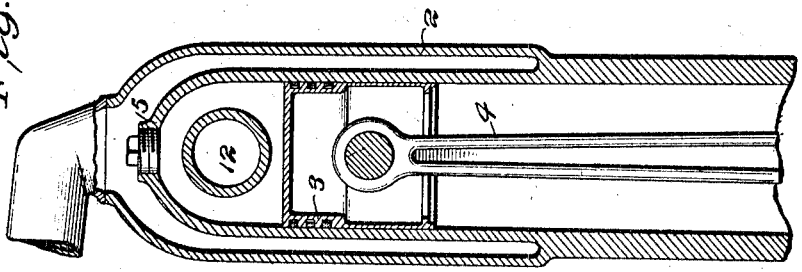
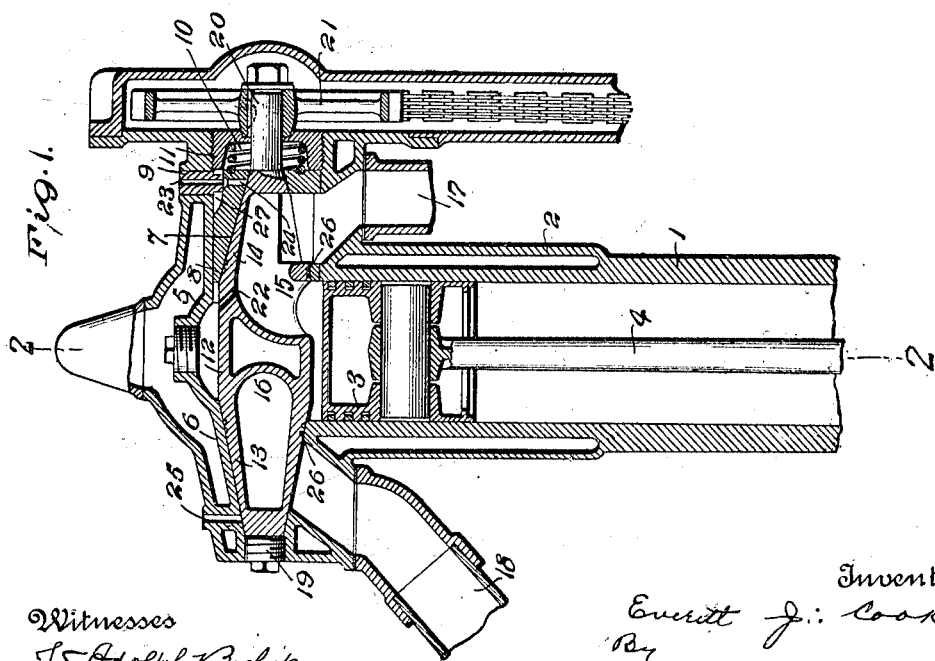
Witnesses
J. Adolph Bishop
C. A. Brown
Inventor
Everett J. Cook
By
Foster, Freeman, Watson & Coit
Attorneys

UNITED STATES PATENT OFFICE.

EVERETT JAQUETTE COOK, OF DETROIT, MICHIGAN, ASSIGNOR OF FIFTY-ONE ONE-HUNDREDTHS TO ROBERT M. CORL, OF TOLEDO, OHIO.

VALVE FOR MOTORS.

1,107,903.  Specification of Letters Patent. Patented Aug. 18, 1914.

Application filed April 24, 1911. Serial No. 623,091.

*To all whom it may concern:*

Be it known that I, EVERETT JAQUETTE COOK, a citizen of the United States, residing at Detroit, county of Wayne, State of Michigan, have invented certain new and useful Improvements in Valves for Motors, of which the following is a specification.

This invention relates to the means for admitting fluid to and exhausting it from a motor and has particular reference to a gasolene engine of the explosive type, but it will be understood that some of the features of the invention are useful in other relations.

It has been my object to so construct and arrange the inlet and exhaust valves of a gasolene engine as to not only properly supply and exhaust the material but to run easily and smoothly without noise or hammering. To this end I make use of balanced rotary valves hereinafter described.

The novel features of the invention will be apparent from the following description taken in connection with the drawings.

In the drawings: Figure 1 is a vertical section through an engine cylinder having my valve applied thereto; Fig. 2 is a vertical section taken on the line 2—2 of Fig. 1.

In these drawings I have shown an ordinary engine cylinder 1, having the water jacket 2 and in which the piston 3 works, this piston being connected in the usual way to a drive shaft by the piston rod 4. Below the cylinder head 5 I place in the side wall of the cylinder valve sockets 6 and 7 providing seats in the housing which are arranged diametrically opposite each other and which preferably taper outwardly as shown so as to furnish conical bearings. The bearing 8, having therein the socket 7, is made removable being preferably circular in cross section and adapted to slide inward so as to make close contact with the end of the valve member. It is prevented from turning by a pin 9 inserted through the top of the casing with its inner end entering a longitudinal slot 27 so as to act as a key and prevent the turning of the bearing 8 while permitting its longitudinal movement. The pin 9 is preferably provided with a central passageway 23 for oil and this passageway may be connected at its outer end in any suitable way to an oil supply. The oil may pass through a passageway 24 so as to lubricate the valve plug 14, and at the other end of the valve member there is a passageway 25 for oil which passageway or duct extends through the socket 6. A spring 10 engages the outer face of the bearing 8 tending to push it inward, this spring being held by a ring 11 having screw-threaded connection with the casing of the cylinder. A valve member 12 having on its ends the tapering valve plugs or seats 13 and 14 extends across the upper end of the cylinder with its valve plugs fitting in the sockets 6 and 7. These valve seats 13, 14 are tapering or inclined relatively to the axis of the valve member 12. This valve member is preferably cylindrical in form with the exception of its tapering end, and passages 15, 16 are formed therein at the opposite ends communicating with the interior of the cylinder. Each of these passages 15, 16, is a port connecting passage, extending from the explosion chamber exposed passage medially surrounding the valve member to communicate respectively with the inlet port 17 and the exhaust port 18. The passageway 15 communicates with the inlet pipe 17 through an opening in its side, and in the same way the passage 16 communicates with the exhaust pipe 18. The opening between the passage 15 and the inlet pipe is of course arranged at a different point on the circumference of the valve member 12 from that of the opening leading from the passageway 16 to the exhaust 18 so that the inlet and exhaust to the cylinder will be properly timed. It is not necessary to describe the relative arrangement of the inlets and outlets since this will be understood by those skilled in the art.

The valve member may be provided with the packing grooves 26 as shown or any other suitable form of packing. A screw plug 19 closes an opening in the casing at one end of the valve member and on the other end there is an extension 20 to which is keyed a sprocket wheel 21 or other means for driving the valve member. It will be understood that the wheel 21 is driven from the main shaft of the engine so as to properly time the admission and exhaust of fluid from the engine by the valve member 12. Since the valve member 12 is symmetrical in cross section and in longitudinal section, and since the passageways 15 and 16 therein are duplicates of each other, any pressure within the engine cylinder upon the valve member will be equal in all directions and consequently it will be balanced. Any pressure tending to force one valve plug against its seat will be counteracted by the tendency to force the opposite valve plug against its seat since the two are connected together and have equal projected areas forming pressure balanced faces. Since the valve operates by continuous rotary motion and is balanced as described it will work easily and without noise to efficiently admit and exhaust the material. In order to more effectively admit the material to the upper end of the cylinder I preferably provide the valve member 12 with a passageway 22 leading into the passageway 15.

Having thus described the invention what I claim as new and desire to secure by Letters-Patent is:

1. An internal combustion engine rotary valve provided with an axially extending inlet port and extending therefrom an axially extending exhaust port, said valve being tapered, and housing means for said valve embodying opposing tapering seats and means for adjusting one of said seats toward and from the valve.

2. The combination with an engine cylinder of a cylindrical valve member extending across said cylinder having tapering ends extending beyond the inner walls of said cylinder and provided with passages communicating with said cylinder, tapering valve sockets in the walls of said cylinder in which the tapering ends of said valve member fit and adjustable means for removing one of said sockets to permit the insertion of the valve member.

3. In a device of the class described the combination with an engine cylinder having outwardly tapering valve sockets in its wall in line on opposite sides, of rotary valve plugs fitting said sockets and having passages communicating with the interior of said cylinder, the said plugs being connected whereby the pressure within the cylinder on one will tend to balance that upon the other, and spring pressed means for relatively adjusting one of said plugs and its socket to automatically maintain a tight joint.

4. In a device of the class described the combination with an engine cylinder having oppositely disposed outwardly tapering valve sockets in its side wall, of a symmetrical valve member extending across said cylinder and exposed on opposite sides to the pressure therein, the said member having tapering ends constituting valve plugs fitting said sockets and having similar passageways to the interior of said cylinder, and spring pressed means for relatively adjusting one of said plugs and its socket to automatically maintain a tight joint.

5. An internal combustion engine rotary valve provided with an inlet port and an exhaust port, said valve being smaller near its outer end, there being a port connecting passage in said valve providing pressure balanced faces, and housing means for said valve embodying a tapering seat, said housing having an explosion chamber exposed passage in communication with the valve passage.

6. An internal combustion engine rotary valve provided with an axially extending passage having a radially extending port, said passage including pressure balanced opposing faces, and a valve housing having an explosion chamber exposed passage in communication with said faces, said housing having a seat for the valve tapering inward as the distance from the communication between the housing and valve passages increases.

In testimony whereof I affix my signature in presence of two witnesses.

EVERETT JAQUETTE COOK.

Witnesses:
ARTHUR L. BRYANT,
JOHN M. COIT.